US009090800B2

(12) United States Patent
Choi et al.

(10) Patent No.: US 9,090,800 B2
(45) Date of Patent: Jul. 28, 2015

(54) ADHESIVE TAPE FOR MANUFACTURING ELECTRONIC COMPONENTS

(75) Inventors: Sung-Hwan Choi, Seoul (KR); Ki-Jeong Moon, Seoul (KR); Hae-Sang Jeon, Seoul (KR); Chang-Hoon Sim, Seoul (KR)

(73) Assignee: TORAY ADVANCED MATERIALS KOREA, INC., Gyeongsangbuk-Do (KR)

( * ) Notice: Subject to any disclaimer, the term of this patent is extended or adjusted under 35 U.S.C. 154(b) by 408 days.

(21) Appl. No.: 13/254,939

(22) PCT Filed: Mar. 9, 2009

(86) PCT No.: PCT/KR2009/001150
§ 371 (c)(1),
(2), (4) Date: Sep. 6, 2011

(87) PCT Pub. No.: WO2010/101324
PCT Pub. Date: Sep. 10, 2010

(65) Prior Publication Data
US 2011/0318580 A1 Dec. 29, 2011

(30) Foreign Application Priority Data
Mar. 3, 2009 (KR) ................. 10-2009-0018211

(51) Int. Cl.
*C09J 7/02* (2006.01)
*C09J 175/16* (2006.01)
*C09J 171/00* (2006.01)
*C08L 75/16* (2006.01)
*C08L 71/00* (2006.01)
*C08L 33/08* (2006.01)

(52) U.S. Cl.
CPC .............. *C09J 7/0242* (2013.01); *C09J 171/00* (2013.01); *C08G 2650/56* (2013.01); *C08L 33/08* (2013.01); *C08L 2312/06* (2013.01); *C09J 2463/00* (2013.01); *Y10T 428/2878* (2015.01)

(58) Field of Classification Search
CPC ....................................................... C09J 171/10
See application file for complete search history.

(56) References Cited

U.S. PATENT DOCUMENTS

| | | | | |
|---|---|---|---|---|
| 4,239,806 A * | 12/1980 | Hsieh et al. | ................... | 428/462 |
| 4,833,116 A * | 5/1989 | Yamori et al. | ................... | 503/200 |
| 5,905,099 A * | 5/1999 | Everaerts et al. | ................... | 522/126 |
| 6,017,603 A | 1/2000 | Tokuda et al. | ................... | 428/64 |
| 6,177,173 B1 * | 1/2001 | Nelson | ........................... | 428/137 |
| 6,303,219 B1 * | 10/2001 | Sawamura et al. | .......... | 428/343 |
| 6,793,762 B1 * | 9/2004 | Kondo et al. | ................. | 156/297 |
| 7,049,001 B2 * | 5/2006 | Haberle et al. | ............. | 428/423.1 |
| 7,135,224 B2 * | 11/2006 | Sumi et al. | .............. | 428/355 EP |
| 2004/0019127 A1 | 1/2004 | Yamamoto | ....................... | 522/39 |
| 2004/0232563 A1 | 11/2004 | Sumi et al. | .................. | 257/783 |
| 2008/0194062 A1 | 8/2008 | Kawai et al. | ................... | 438/118 |
| 2008/0226884 A1 | 9/2008 | Sim et al. | ...................... | 428/216 |
| 2010/0080995 A1 | 4/2010 | Ishimatsu et al. | .......... | 428/411.1 |
| 2010/0167073 A1 * | 7/2010 | Kitakatsu | ................... | 428/473.5 |
| 2010/0247906 A1 | 9/2010 | Lee et al. | | |

FOREIGN PATENT DOCUMENTS

| | | | |
|---|---|---|---|
| CN | 101265393 | 9/2008 | ................. C09J 7/02 |
| CN | 101479356 | 7/2009 | ................. C09J 7/02 |
| EP | 0227002 | 12/1992 | .............. C09J 167/00 |
| GB | 2184728 | 7/1987 | ................. C09J 3/16 |
| JP | 62-148584 | 7/1987 | ................. C09J 3/16 |
| JP | 62153311 | 7/1987 | ........... C08F 299/06 |
| JP | 63-135474 | 6/1988 | ................. C09J 5/00 |
| JP | 09-031416 | 2/1997 | ................. C09J 4/02 |
| JP | 10-178274 | 6/1998 | ............... H05K 3/46 |
| JP | 11-238538 | 8/1999 | ............ H01R 11/01 |
| JP | 2001-240842 | 9/2001 | ............. C09J 201/00 |
| JP | 2004-082295 | 3/2004 | ............. B23B 49/00 |
| JP | 2004-323796 | 11/2004 | ............. C09J 175/16 |
| JP | 2005-244150 | 9/2005 | ............... H05K 3/28 |
| JP | 2007-009201 | 1/2007 | ............. C09J 171/10 |
| JP | 2007-277282 | 10/2007 | ................. C09J 7/02 |
| JP | 2008-094870 | 4/2008 | ............. C09J 179/08 |
| JP | 2008-305887 | 12/2008 | ............... H01L 21/60 |
| KR | 1020040030979 | 4/2004 | ................. C09J 7/02 |
| KR | 1020090013920 | 2/2009 | ................. C09J 7/02 |
| KR | 1020090053062 | 5/2009 | ............... C09J 19/02 |
| KR | 10-2010-0134438 | 12/2010 | ........... H01L 21/336 |
| TW | 200909489 | 5/2008 | |
| TW | I299354 | 8/2008 | ................. C09J 7/02 |
| WO | WO 01/04228 | 1/2001 | ................. C09J 7/02 |
| WO | WO 01/35460 | 5/2001 | ............. H01L 23/12 |
| WO | WO 2007018120 A1 * | 2/2007 | |
| WO | WO 2007/129711 | 11/2007 | ............... H05K 1/14 |
| WO | WO 2009/020253 | 2/2009 | ................. C09J 7/02 |

OTHER PUBLICATIONS

Search Report (SR) in Taiwan Patent Application No. TW 098128793, dated Sep. 7, 2012.
Office Action, dated May 9, 2013, issued in CN Application No. 200980140767 with English Translation.
Taiwan Search Report (SR) in Taiwan Patent Application No. TW 098128793, dated Jun. 7, 2013.
International Search Report (ISR) and Written Opinion (WO) in PCT/KR2009/001150 dated Mar. 11, 2010, with attached English translation of ISR.

* cited by examiner

*Primary Examiner* — Frank D Ducheneaux
(74) *Attorney, Agent, or Firm* — Harness, Dickey & Pierce, P.L.C.

(57) ABSTRACT

There is provided an adhesive tape for manufacturing electronic components comprising a heat-resistant substrate and an adhesive layer containing an adhesive composition disposed on the heat-resistant substrate, wherein the adhesive composition comprises a phenoxy resin, a curing agent, an energy ray curable acrylic resin and a photoinitiator, and wherein the adhesive layer is cured by heat and an energy ray.

5 Claims, No Drawings

ADHESIVE TAPE FOR MANUFACTURING ELECTRONIC COMPONENTS

CROSS-REFERENCE TO RELATED APPLICATIONS

This application is a national phase application of PCT Application No. PCT/KR2009/001150 filed on Mar. 9, 2009, which claims the benefit and priority to Korean Patent Application No. 10-2009-0018211 filed Mar. 3, 2009. The entire disclosures of the applications identified in this paragraph are incorporated herein by references.

FIELD

The invention relates to an adhesive tape used in manufacturing electronic components and more particularly in manufacturing electronic components in which an adhesive layer needs to have no adhesion at room temperature but exhibits adhesion only in the heat-laminate process to enable the tape to be attached to a lead frame. This tape demonstrates exceptional heat-resistance to thermal treatment in the process of manufacturing a semiconductor device. This can be achieved by additional photocuring of the adhesive layer, forming partially interpenetrated polymer networks. This tape serves to enhance reliability of the semiconductor device during the process of manufacturing it, avoids encapsulation material leak, and also avoids the adhesive to be transferred to the lead frame or encapsulation material when removing the tape after completing the manufacturing process.

BACKGROUND

Today, as people increasingly use more handheld apparatuses (e.g., mobile phones, laptop computers, DVD/CD/MP3 players, PDA, etc.), compactness and lightweight thereof is essential. Accordingly, the first challenge is to produce compact and thin semiconductor packages used in the handheld apparatuses. For conventional semiconductors, employed is a surface mount packaging manner (gull-wing SO format or QFP (quad-flat-package)) in which a semiconductor is connected to a circuit board via an extended lead, which does not meet all of the current requirements aforementioned. In particular, for a handheld communication apparatus in which a high frequency of several GHz is used, performance and efficiency thereof is degraded due to exothermic reaction by means of dielectric loss of semiconductor devices.

Recently, quad flat no-lead packages (QFN) without leads to address such requirements of semiconductors are highly demanded. In QFN's, the lead is not extended but exposed toward a package bottom as a land form around a die, to be soldered directly onto a circuit board. It is thus possible to produce a package which is significantly smaller and thinner than a package with a lead and which advantageously occupies 40% less area than an existing package on a circuit board. In terms of heat emission, a lead frame is positioned on the bottom of a package and a die pad is exposed directly toward the outside to be advantageous in heat radiation, differently from a typical manner that a lead frame to place chips thereon is covered by sealing resin. Accordingly, the present package is superior in electrical properties to a conventional package with an extended lead, and has self-inductance half of that of the typical package.

Since there exists an interface where the lead frame and the sealing resin surface coexist on the bottom of the package as such, the sealing resin easily goes between the lead frame and a general molding frame to contaminate the land surface or the die pad surface if the general metal frame is used. Therefore, it is essential to use an adhesive tape to laminate a lead frame, subsequently to undergo the QFN manufacturing process and the resin sealing process in order to avoid bleed-out or flashing of the sealing resin during the resin application process.

Meanwhile, the process which involves using a heat-resistant adhesive tape while manufacturing a semiconductor device generally consists of tape lamination→die attach→wire bonding→EMC molding→detaping.

Firstly, in the process of tape lamination, an adhesive tape is adhered to a copper or PPF (Pre-Plated Frame) lead frame with a laminator. In this case, the properties of the adhesive tape depend on the type and scheme of the laminator. The exemplary scheme of tape lamination includes using a roller, hot press, a combination thereof, and pressing only the dam bar on a lead frame, etc. It is essential that the adhesive layer closely laminates the lead frame without any bubbles and adhesiveness should be kept without delamination while handling the lead frame laminated with the adhesive tape.

Secondly, in the process of attaching a die to a lead frame, an adhesive layer of epoxy, polyimide or silicon in a paste phase or a film shape is cured for a period of 20 to 60 minutes at 150 to 170° C. to attach the die to the lead frame simultaneously. During this process, the adhesive tape used to laminate the lead frame should not adversely affect die attachment while keeping the adhesive layer or the base layer without chemical and physical deformation and with stale heat resistance.

Thirdly, in the wire bonding process, the die is connected electrically to the land of lead frame by means of gold, aluminum, copper wire, etc. In this process, the wire is bonded by means of heat, pressure or ultrasonic waves. This process continues for a minimum of 20 minutes to a maximum of 2 hours or so at 100 to 300° C. For secure bonding while the wire is bonded to the die and the land, respectively, high temperature, pressure or even ultrasonic vibration is required. Therefore, if there occur changes in physical properties of the tape which supports the lead frame on the bottom thereof in the wire bonding process, it may result in poor wire bonding, which wire is the most important component in a semiconductor device. In other words, the wire may be damaged or it may create a poor bonding interface. Accordingly, it is essential that the adhesive layer itself including the substrate has good heat resistance, deforms little against external physical force and also has good durability.

Fourthly, in the EMC molding process, the lead frame/tape which went through the die attach process and the wire bonding process is sealed in a molding frame with sealing resin. This process is carried out for 3 to 5 minutes at a high temperature of 175 to 190° C. While each element or a plurality of elements is sealed simultaneously, in order to prevent the resin from flowing into and penetrating into the interface between the lead frame and the tape, the tape should be adhered closely to the lead frame at a high temperature. Otherwise, the flow at high temperature and high pressure may result in bleed-out or flash of the sealing resin. In addition, the adhesive layer directly contacting the sealing resin may react with the sealing resin to leave residual adhesive on the sealing resin surface in a later process. In other cases, sealing resin flow may cause physical shear in the adhesive layer to result in an uneven sealing resin surface.

Fifthly, in the detaping process, as mentioned in the EMC molding process, it is essential that the sealing resin surface that contacted the adhesive layer should be physically or chemically uniform and there is no residual adhesive left, after removing the tape. There should be no adhesive left on the surface of lead frame as well. Detaping may be carried out manually at room temperature or by means of an automated machine which can achieve heating. In case of using a machine, the tape-adhered lead frame which went through the EMC molding process with sealing resin is made to pass through an oven or hot plate for detaping at a heated state of proper temperature.

To sum up for features required for an adhesive tape used in the process of manufacturing semiconductor devices as mentioned above, the tape should be adhered closely to the lead frame without apparent bubbles formed, in conformity with the scheme of lamination by each laminator, and the tape should not experience physical or chemical changes in the temperature range and for the process time required for good die attachment or wire bonding. In other words, it should be avoided that a part of the adhesive layer comes out in an outgas phase to be absorbed into the surface of a semiconductor device element and in turn to degrade interface coupling force that should be bonded. Also, changes in the dimension of the tape or extreme changes in the values, e.g., the modulus of elasticity or viscosity which is a physical property of the adhesive layer to cause the adhesive layer to flow down or to be crumbled due to too high hardness may have an adverse effect on the reliability of the semiconductor device. During the process of EMC molding, the tape should be adhered closely to the lead frame so that the sealing resin does not penetrate into the interface and thus not to contaminate the surface of the lead frame. Of course, it is possible to apply a deflash process after the detaping process, but it is recommended that there is no additional process of washing in terms of efficiency and economy. There should be no peculiar reaction between the adhesive and the sealing resin so that the state of the sealing resin surface is implemented as the sealing resin was originally intended, and there should be no adhesive left on the surface. Also, there should be no adhesive residue left on the surface of lead frame.

In particular, in the present invention, it is a further object to develop an adhesive layer which meets required characteristics of a tape and which is suitable for use with a laminator for lamination by means of a hot press selected among the various manners of lamination, as described above. In this case, the adhesive layer should not exhibit adhesiveness to materials, e.g., stainless steel (STS), which is a general material for laminator components, at room temperature, but implement adhesiveness only when a given heat and pressure is applied thereby to enable the layer to laminate the lead frame.

There is a limitation to implement such temperature-dependent initial adhesiveness with conventional acrylic or silicon based adhesives. In other words, it is impossible to implement near zero adhesiveness at room temperature but full adhesiveness only in heating. It might be possible to minimize physical coupling force of a tape applied to an adhered object by means of adjustment of adhesive components or functional groups. However, the adhesive is closely attached to an adhered object due to the viscosity of the adhesive via a basically low glass transition temperature, without great external pressure, thereby to adversely affect the lamination process.

With the heat-curable acrylic adhesive, adhesive residues are left on the lead frame or on the sealing resin surface after detaping because of a limitation in intrinsic heat-resistant cohesion or good tack. It is well known in the art that, with a silicon adhesive, if the non-cured adhesive of low molecular weight is evaporated in an outgas phase in a high temperature process, the adhesive is easily absorbed or fixed into a surface of semiconductor device and semiconductor elements due to its low surface energy thereby to contaminate the device and have remarkable adverse effect on semiconductor reliability associated with wire bonding or die attachment. The silicon adhesive is expected to be advantageous in terms of a leak of sealing resin because of its high adhesiveness, but due to the high strain resulting from high viscosity, a flow of sealing resin at a high temperature and high pressure force into between the lead frame and the adhesive layer thereby causing a leak of sealing resin.

SUMMARY OF THE INVENTION

The invention was devised to solve the aforementioned problems. It is an object of the invention to provide an adhesive tape used in manufacturing electronic components which meets all of the characteristics required in a specific lamination process set forth and which mitigates the issue of adhesive residues and sealing resin leak of conventional adhesive tapes used in a process of manufacturing semiconductor devices.

The aforementioned and other objects and advantages of the invention will be apparent from the following detailed description which illustrates a preferred embodiment of the invention.

The aforementioned object is achieved by an adhesive tape used in manufacturing semiconductor parts comprising a heat-resistant substrate and an adhesive layer in which an adhesive composition is applied on the heat-resistant substrate, characterized in that the adhesive composition comprises a phenoxy resin, a curing agent, an energy ray curable acrylic resin and a photo initiator, and in that the adhesive layer is cured by heat and energy rays.

Here, the adhesive tape is characterized in that the heat-resistant substrate is 5 µm to 100 µm in thickness, has 110° C. to 450° C. of the glass transition temperature, 1 ppm/° C. to 35 ppm/° C. at 100° C. to 200° C. of the thermal expansion coefficient of the substrate and 1 GPa to 10 GPa of the modulus of elasticity at room temperature.

Preferably, the adhesive tape is characterized in that the phenoxy resin is a phenoxy resin or denatured phenoxy resin and the weight average molecular weight thereof is 1,000 to 500,000.

Still preferably, the adhesive tape is characterized in that the energy ray curable acrylic resin has at least one carbon double bond in one molecule.

Still preferably, the adhesive tape is characterized in that the room temperature adhesiveness to stainless steel (STS) of the adhesive layer is 0 to 1 gf/50 mm.

Still preferably, the adhesive tape is characterized in that the glass transition temperature of the adhesive composition ranges from 80° C. to 150° C.

Still preferably, the adhesive tape is characterized in that the adhesive composition comprises 5 to 20 parts by weight of curing agent and 5 to 30 parts by weight of energy ray curable acrylic resin on the basis of 100 parts by weight of phenoxy resin, and comprises 0.5 to 10 parts by weight of photoinitiator on the basis of 100 parts by weight of energy ray curable acrylic resin.

ADVANTAGEOUS EFFECT

According to the invention, the adhesive layer is not adhesive at room temperature, but only exhibits adhesiveness during the process of heat-lamination, enabling the tape to laminate a lead frame. Additional photo-curing of the adhesive layer forms a partially interpenetrating network structure, so that the adhesive tape is improved in heat resistance for the thermal history to which the adhesive tape is exposed during the process of manufacturing a semiconductor device, the adhesive tape assists to improve reliability of the semiconductor device during the process of manufacturing it, and prevents a leak of encapsulation material and also prevents adhesive residues being left on the encapsulation material or lead frame in removing the tape after finishing the manufacturing process.

DETAILED DESCRIPTION OF EMBODIMENTS

Hereinafter, the invention will be described in more detail with reference to the embodiment of the invention. It will be apparent to those skilled in the art that the embodiment is intended to illustrate the invention in more detail, and the scope of the invention should not be limited by the embodiment.

The adhesive tape used in manufacturing electronic components according to the invention is used for masking, which is needed in a process of manufacturing semiconductor devices and meets the characteristics required therefor. The adhesive tape according to the invention is based on, as a main material, a thermoplastic phenoxy resin which is highly adhesive to metals, e.g., lead frames and also highly heat-resistant. The adhesive tape according to the invention does not exhibit bleed-out or flash of the sealing resin because of its high closeness and adhesiveness to a lead frame and is adjustable to the temperature at which adhesiveness to a lead frames is exhibited by controlling hardness. The inventive adhesive tape is improved in cohesion by means of an additional crosslink structure by irradiating added photo-curable resins with energy rays and thereby has no adhesive residues left on a lead frame or a sealing resin surface after detaping.

Of course, the adhesive tape used in manufacturing electronic components according to the invention will be illustrated for an exemplary semiconductor packing process, but not limited thereto, and applicable to a mask sheet in the process of manufacturing all sorts of electronic components carried out at high temperatures.

A substrate used for producing the adhesive tape for manufacturing electronic components in the invention is of a highly heat-resistant polymer film, the substrate being applied with an adhesive composition to form an adhesive layer.

For such a heat-resistant substrate, required is that it is possible to process it in a form of film and it should be fully heat resistant to have no physical-chemical changes in the aforementioned temperature range and for the time period aforementioned.

It is preferred that such a heat-resistant substrate is weight-reduced by 5% from the temperature of at least 300° C. and the thermal expansion coefficient thereof ranges from 1 to 35 ppm/° C. at 100 to 200° C. It is preferred that the glass transition temperature thereof ranges from 110° C. to 450° C. High temperature-resistant in stable and excellent condition contributes to keeping the evenness of the substrate in lamination at a high temperature thereby enabling lamination uniformly and ensuring good wire bonding. Dimensional stability of the film to be kept on at a high temperature can restrain a leak of resin because deformation does not occur in a molding frame during the EMC molding process. In addition, it is preferred that the modulus of elasticity is kept on between 1 GPa and 10 GPa at room temperature, and between 100 and 5000 MPa at the temperature between 100 and 300° C. If a substrate film having too low modulus of elasticity or strongly apt to be folded is used, wrinkles that may occur during the process of handing or loading the tape to a laminator or the process of feeding the tape to a machine are left in turn to cause poor lamination result (that is, partial delamination), nonuniform wire bonding and resin bleed-out. One of applicable substrates to meet the aforementioned characteristics is a heat-resistant polymer film, and examples thereof include films processed with heat-resistant polyethylene terephthalate, polyethylenenaphthalate, polyphenylene sulfide, polyimide, polyester, polyamide, polyetherimide, etc.

There is no specific limit for the thickness of the substrate film, and it is thus determined depending on the application requirements of the laminator and the resin encapsulation machine. Generally, a preferred thickness thereof ranges from 5 to 100 µm, but the range from 10 to 40 µm is more preferred to avoid wrinkles caused by external force, keep appropriate heat resistance and for easy handling. If required, sand matting treatment, corona treatment, plasma treatment and primer treatment may be applied to the substrate in order to enhance adhesiveness of the adhesive to the substrate film.

The adhesive layer in the adhesive tape used in manufacturing electronic components according to the invention is mainly based on a thermoplastic phenoxy resin which is heat resistant and highly adhesive and comprises a curing agent for the phenoxy resin, a photocurable resin (energy ray curable acrylic resin) for controlling excessive curing shrinkage of the phenoxy resin while keeping heat resistance and a photoinitiator for the purpose.

The main adhesive component in the adhesive composition used in the adhesive layer of the adhesive tape used in producing electronic components according to the invention is a phenoxy resin which is a thermoplastic resin. Examples of the phenoxy resins include a bisphenol-A type phenoxy, a bisphenol-A type/bisphenol-F type phenoxy, a brominated phenoxy, a phosphorus phenoxy, a bisphenol-A type/bisphenol-S type phenoxy, a caprolactone denatured phenoxy resin, etc., but, among others, the bisphenol-A type phenoxy resin is more preferred in terms of advantages in heat resistance, environmental friendliness, compatibility with curable agents, and a curing speed.

Preferably, the weight average molecular weight of phenoxy resin ranges from 1,000 to 500,000. In this case the adhesive residues can be minimized in detaping because of enhanced heat resistance resulting from increased internal cohesion. For the molecular weight below 1000, internal cohesion performance is degraded, so that the property of heat resistance required is not implemented. The molecular weight above 500,000 leads to reduced workability resulting from a high viscosity and to an uneven coating surface after the coating process, and it is hard to control mixing with other raw materials as well.

Types of organic solvents which can dissolve the phenoxy resin include ketone-, alcohol-, glycol ether-, ester-based solvents. To name a few among them, included are cyclohexanone, methylethyl ketone, benzyl alcohol, diethylene glycolalkylether, phenoxy propanol, propylene glycol methylether acetate, tetrahydrofuran, N-methylpyrrolidone, etc., and they can be used independently or as a mixture in combination of two or more types thereof. When using an organic solvent, an appropriate amount of phenoxy resin ranges from 5 to 40 parts by weight and 20 to 30 parts by weight thereof is more preferred, on the basis of 100 parts by weight of organic solvent. If required, aromatic hydrocarbonate solvents may be added as a dilution agent, e.g., toluene, xylene, aromatic 100 and hexane, in order to improve poor coating and enhance adhesiveness to the substrate film. The amount of dilution agent should not be above 40% with respect to the amount of the solvents.

The phenoxy resin may be used with a crosslinking agent properly added. The crosslinking agent or curing agent applicable is not limited to any special type, as long as it can cure resins having a hydroxyl group as a functional group. Examples of the crosslinking or curing agent include melamine, urea-formaldehyde, isocyanate functional prepolymers, phenolic curing agents, amino-curing agents, etc. The amount of the curing agent preferably ranges from 0.1 to 40 parts by weight and more preferably from 5 to 20 parts by weight, on the basis of 100 parts by weight of phenoxy resin. If the amount of the curing agent is smaller than desired (e.g., <5 parts by weight) thereby forming a poor crosslinking structure, the adhesive layer in turn gets soft (with a reduced relative glass transition temperature and an increased loss modulus accordingly), so that the lead frame goes into the adhesive layer too far in lamination and the adhesive pushed by the lead frame comes up around the die pad or the land of the lead frame, thereby staying between the sealing resin and the lead frame in the EMC molding process to result in adhesive residues left in detaping. The amount of the curing agent more than desired (e.g., >20 parts by weight) leads to too low adhesiveness and wettability of the adhesive layer and thus causes delamination, and the adhesive layer to be crumbled in lamination due to the strength increased too much. In addition, excessive curing shrinkage may cause the tape to be bent during the process of drying and curing the tape after applying the adhesive to a substrate film, causing a poor result in lamination.

The energy ray curable acrylic compound (resin) for forming the additional crosslinking structure in the crosslinking structure of the phenoxy resin may be one of acrylic polymers, acrylic oligomers, acrylic monomers, etc., having carbon-carbon double bonds, and should have at least one unsaturated bond. This acrylic group acts as a functional group for forming a crosslinking structure by means of a free-radical reaction, depending on the number of groups, it is possible to control reactivity, the crosslinking structure and curing levels. The greater the number of the functional groups is, the faster the reaction (crosslinking) speed is, the higher the glass transition temperature is, and the higher heat resistance is, but it is disadvantageous that flexibility and adhesiveness of the adhesive layer reduces. Selecting an acrylic resin having a proper number of functional groups should focus on balance between adhesiveness and stiffness, as in selecting a curing agent for curing the phenoxy resin.

Examples of such acrylic compounds used in energy ray curing include epoxy acrylate, aromatic urethane acrylate, aliphatic urethane acrylate, polyether acrylate, polyester acrylate, acrylic acrylate, etc., which can be used independently or in combination of two or more different types of oligomers.

The oligomers may be selected depending on the number of functional groups, and the oligomers having 2 to 9 functional groups can be selected. Preferred oligomers are those having 6 to 9 functional groups in order to achieve desired wire bonding in the adhesive layer with increased cohesion, strength and glass transition temperature by means of high curing density and in order to prevent the residue of the adhesive layer from being left on the sealing resin surface and the lead frame in detaping.

The amount of the energy ray curable acrylic compound ranges from 1 to 40 parts by weight, and preferably 5 to 30 parts by weight, on the basis of 100 parts by weight of the phenoxy resin.

Lastly, the photoinitiators used for initiating the energy ray curable acrylic compound to be cured with energy rays are generally based on benzo phenone, thioxanthone, alpha hydroxy ketone, alpha amino ketone, phenyl glyoxylate, alacryl phosphine, etc. The initiators may be used independently or in combination of two or more types thereof depending on the efficiency and features thereof in order to form a uniform crosslinking structure depending on the thickness of the adhesive layer or the intensity of the energy ray, etc. The amount of photoinitiator ranges from 0.5 to 10 parts by weight, and preferably from 1 to 5 parts by weight, on the basis of 100 parts by weight of the energy ray curable acrylic resin.

The glass transition temperature of the adhesive composition for the adhesive tape used in manufacturing electronic components according to the invention preferably ranges from 80° C. to 150° C., and the room temperature adhesiveness to the stainless steel (STS) of the adhesive layer preferably ranges from 0 to 1 gf/50 mm. The glass transition temperature below 80° C. leads to extreme changes in the physical properties of the adhesive at high temperature by means of thermal history during the QFN process, and the glass transition temperature above 15° C. leads to extreme warpage after lamination because the temperature for tape lamination is above 170° C. (that is, while strong thermal expansion of a lead frame is caused in the lead frame, the difference in thermal expansion between the frame and the tape grows larger thereby to increase warpage).

The invention can be practiced as in the following embodiment which will be described hereinafter and it should be noted that the invention is not limited by the embodiment.

Embodiment

Firstly, 100 parts by weight of phenoxy resin (YP50, available from Kukdo Chemical Co.) was dissolved in 300 parts by weight of methyl ethyl ketone to which resultant solution added were 15 parts by weight of isocyanate curing agent (CE138, available from Dow Corning Co.), 20 parts by weight of aliphatic polyurethane acrylate which is an energy ray curable compound (UV7600B80, available from Japan Synthetic Co.), 2 parts by weight of alacryl phosphine photoinitiator (DAROCUR TPO, available from CYTEC), in order to produce a composition of the components by mixing them for one hour. The adhesive composition obtained by mixing the components was applied on a polyimide film (LN, available from Kolon) of which the thickness was 25 μm and the resultant film was dried in a drier at 150° C. for about 3 minutes. The resultant film was observed to be about 6 μm in thickness. A prior art tape dried through a drier goes through a step of energy ray curing in order to form an additional crosslinking structure, but, in this embodiment, it was irradiated with ultraviolet rays. The amount of ultraviolet rays was about 300 mJ/cm$^2$. For completely curing inner parts of the adhesive layer, used was an electrodeless UV lamp which emits energy rays in a range of long wavelength of ultraviolet rays A (315 to 400 nm). The amount of ultraviolet rays used for irradiation was controlled depending on the combination of the intensity of the UV lamp, the distance from the irradiated side, the time period of irradiation, etc. The adhesive layer was irradiated with ultraviolet rays in a nitrogen atmosphere in order to prevent the energy ray curing efficiency from being reduced due to oxygen.

Comparative Example 100 parts by weight of acrylic resin (AT5100, available from Samwon Co.), the main material for the adhesive, was dissolved in 320 parts by weight of ethylacetate, to which resultant mixture added were 10 parts by weight of isocyanate curing agent (CE138, available from Dow Corning Co.), 25 parts by weight of aliphatic polyurethane acrylate which is an energy ray curable compound (UV7600B80, available from Japan Synthetic Co.), 0.5 parts by weight of epoxy acrylate (EB600, available from CYTEC), 0.1 part by weight of silicon acrylate, one part by weight of alacryl phosphine photo-initiator (DAROCUR TPO, available from CYTEC), in order to produce a composition of the components by mixing them for one hour. In order to achieve adhesiveness exhibited in lamination at high temperature and avoid adhesive residues in detaping, epoxy and silicon acrylate were added. The adhesive composition obtained by mixing the components was applied on a polyimide film (LN, available from Kolon) of which the thickness was 25 μm and the resultant film was dried in a drier at 150° C. for about 3 minutes. The resultant film was observed to be about 6 μm in thickness. The tape dried through the drier was irradiated with ultraviolet rays in order to form an additional crosslinking structure in a nitrogen environment. In this case, the amount of ultraviolet rays was about 300 mJ/cm².

The adhesive tapes for manufacturing electronic components produced according to the above embodiment and the comparative example were evaluated, respectively, and the result of evaluation is shown in the following Table 1. Since the experiment and the method of evaluation were carried out according to the manner well known to those skilled in the art, it will thus not be described herein.

ness by means of Van Der Waals force or polar groups owing to the softened or tenderized adhesive layer coming from the acrylic chains of polymers (whose weight average molecular weight lies in about 800,000). As a result, this small amount of adhesiveness had adverse effect on feeding the tape for the aforementioned lamination apparatus to result in 20% of failure in workability.

For the comparative example, because of the relatively excessive amount of energy ray curable oligomer added to eliminate the initial adhesiveness at room temperature, there was not exhibited sufficient adhesiveness in lamination at high temperature, so that partial delamination was observed, and wrinkles in the tape were found, which were contributed by the part adhered to the lead frame and the part not adhered thereto, visibly ascertainable. In the comparative example, such a low level of adhesiveness caused a significant amount of resin leak in the EMC molding process and it was observed that the surface of the lead frame was contaminated by the sealing resin. When looking through the mark of the lead frame pattern left after detaping, it found conglomerate adhesives resulted from being pressed and pushed around the mark of the die or the land. It was considered that, while the adhesive layer relatively soft in the comparative example was deformed due to resin flow at high temperature and high pressure during the EMC molding process, it might facilitate

TABLE 1

| | Category | |
|---|---|---|
| | Embodiment | Comparative Example |
| | Type of adhesive | |
| | Thermoplastic phenoxy resin | Acrylic resin |
| Adhesiveness at room temperature for STS304 plate | no | Almost no |
| Lamination condition | Hot press, 200° C., 2 MPa, 20 seconds | |
| Level of lamination | Good | Wrinkles |
| 5% weight loss temperature (° C.) | 430 | 330 |
| Glass transition temperature (° C.) | 120 | 30 |
| Modulus of elasticity of tape at 200° C. (Pa) | $2.8 \times 10^9$ | $1.6 \times 10^9$ |
| Outgas (%) ± 0.1 at 200° C. | 1.2 | 1.6 |
| Adhesiveness (gf/53 mm, copper model L/F) Detaping after lamination | 15 | 5 |
| Hot plate, 220° C., detaping after 45 minutes | 130 | 20 |
| Adhesive residues (after detaping) Lead frame surface | no | residues |
| Sealing resin surface | no | no |
| Sealing resin leak | no | severe |
| Lead frame mark left on the adhesive layer after detaping | Apparent | Pushed adhesive layer |

As seen from the above Table 1, compared were the physical properties which are associated with main features as an adhesive tape used in manufacturing semiconductor devices produced according to the embodiment of the invention which is based on a phenoxy resin and according to the comparative example which is based on an acrylic resin.

An adhesive composition was selected considering no adhesiveness to stainless steel at room temperature for application of the adhesive tape in terms of lamination. Both of the tapes had almost no adhesiveness at room temperature to the material STS 304, but the tape in comparative example has a very small amount of adhesiveness between the adhesive and the material STS 304. It is estimated that the intrinsic adhesiveness of an acrylic resin cannot be removed by means of UV curing or it might result from a small amount adhesiveness caused by the increased adhered surface owing to physical deform of the adhesive layer, but not from the adhesive-resin leak. However, in the embodiment, it was observed that the roughness on the surface of the die or the land was engraved on the adhesive layer without the adhesive layer being pushed, and the adhesive closely contacted the lead frame thereby to have no resin leak.

As seen from the comparison of the relative values for 5% weight loss temperature, the glass transition temperature, the dynamic young's modulus and outgas, respectively measured with a thermogravimetric analyzer, a differential scanning calorimeter, a dynamic mechanical analyzer and a moist analyzer, it was observed that the crosslinking density was higher in the embodiment in which the phenoxy resin and the energy ray curable compound were used, so that the strength of the adhesive layer was greater, the adhesive layer exhibiting good heat resistance. Only in the case of the embodiment, no adhesive residue was left on the lead frame in detaping after the die attach process (carried out in an oven at 175° C. for 45 minutes), the wire bonding process (carried out on a hot plate at 220° C. for 45 minutes) and the EMC molding process. In the case of the embodiment, the rate of poor wire bonding was approximately 300 ppm in the wire bonding inspection, which means very good results.

Also, in case of an adhesive based on an acrylic resin, it was seen that there are limitations in producing an adhesive which is adhesive only at high temperature, not at room temperature, which is an intrinsic feature of acrylic resins. However, the inventors could see that the thermoplastic phenoxy resin was very suitable for lamination which requires adhesiveness only at high temperature without being adhesive at room temperature. It was observed that the adhesive layer was pushed when the 3 dimensional interpenetrating network and crosslinked structure was not formed by means of the energy ray curable compound. In addition, it was observed that, in detaping the tape after going through the simulated thermoprocess described above, adhesive residues were left on the lead frame because of insufficient heat resistance.

From the foregoing description, it will be apparent to those skilled in the art that various modifications and changes can be made without departing from the true sprit and scope of the present invention. It should be understood that the foregoing description is intended to illustrate and not to limit the scope of the invention as defined by the claims.

The invention resides in each and every novel characteristic feature and each and every combination of the features.

What is claimed is:

1. An adhesive tape comprising a heat-resistant substrate and an adhesive layer containing an adhesive composition disposed on the heat-resistant substrate, wherein the adhesive composition consists of a bisphenol A phenoxy resin dissolved in an organic solvent, a curing agent, an energy ray curable acrylic resin and a photoinitiator, wherein the adhesive composition comprises 5 to 40 parts by weight of phenoxy resin on the basis of 100 parts by weight of the organic solvent, 5 to 20 parts by weight of the curing agent and 5 to 30 parts by weight of the energy ray curable acrylic resin on the basis of 100 parts by weight of the bisphenol A phenoxy resin, and 0.5 to 10 parts by weight of the photoinitiator on the basis of 100 parts by weight of the energy ray curable acrylic resin, and wherein the adhesive layer is formed by curing the adhesive composition, and the adhesive composition of the cured adhesive layer has a glass transition temperature ranging from 80° C. to 150° C.

2. The adhesive tape of claim 1, wherein the adhesive layer is cured by heat and an energy ray.

3. The adhesive tape of claim 1, wherein the heat-resistant substrate is 5 μm to 100 μm in thickness, and has a thermal expansion coefficient ranging from 1 ppm/° C. to 35 ppm/° C. at 100° C. to 200° C.

4. The adhesive tape of claim 3, wherein the heat-resistant substrate has an elastic modulus ranging from 1 GPa to 10 GPa at room temperature.

5. The adhesive tape of claim 1, wherein the adhesion strength of the adhesive layer to stainless steel (STS) at room temperature ranges from 0 to 1 gf/50 mm.

* * * * *